A. BELZ.
THREADING DEVICE FOR SHUTTLES.
APPLICATION FILED JULY 9, 1912.

1,052,208.

Patented Feb. 4, 1913.
4 SHEETS—SHEET 1.

Witnesses:

Inventor:
Albert Belz

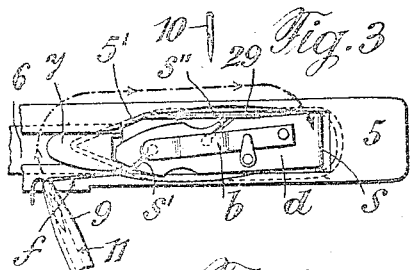
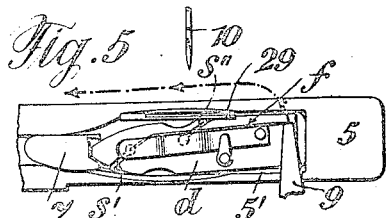
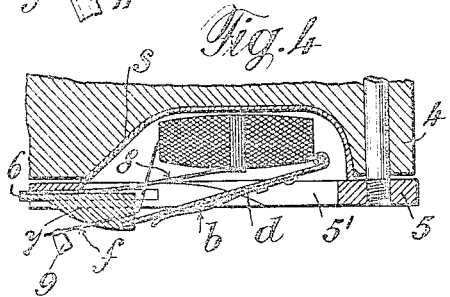
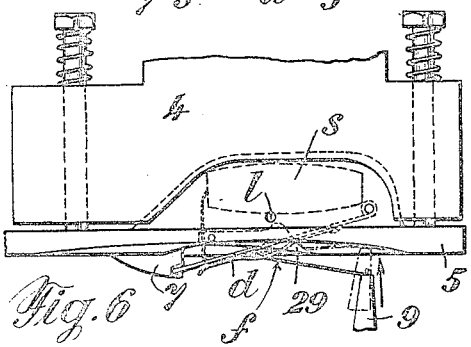
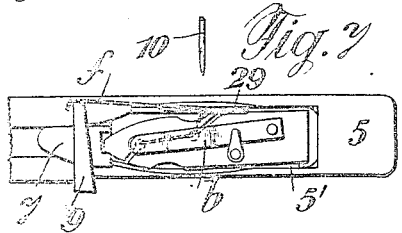
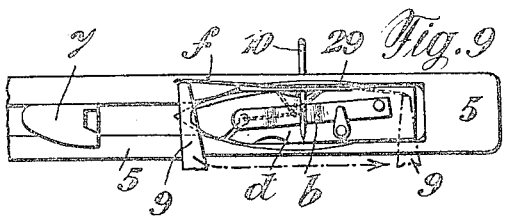
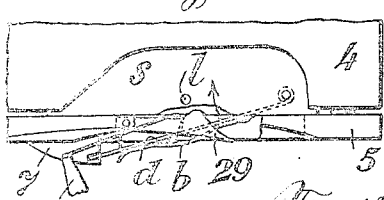
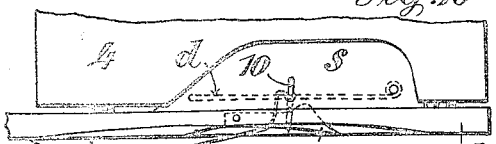
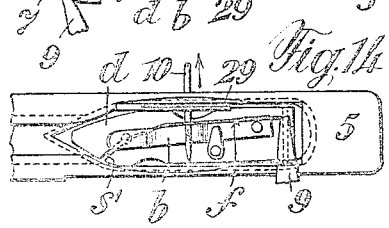
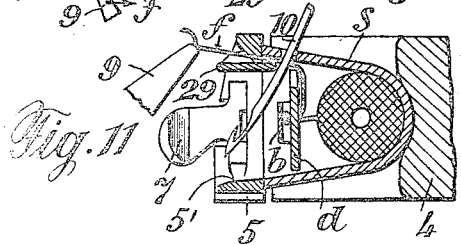
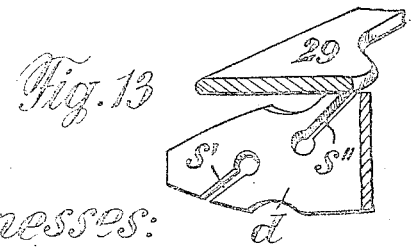
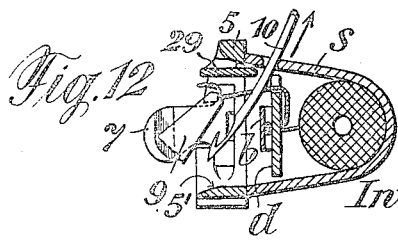

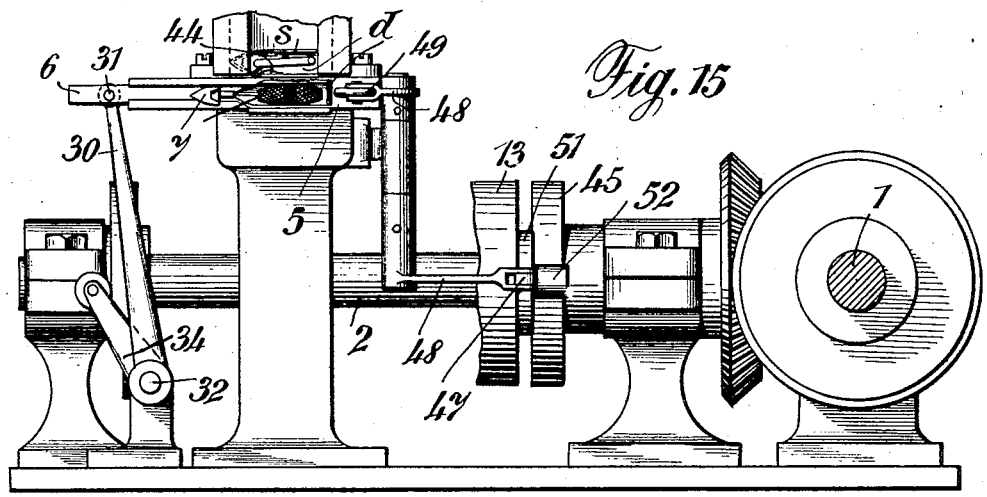
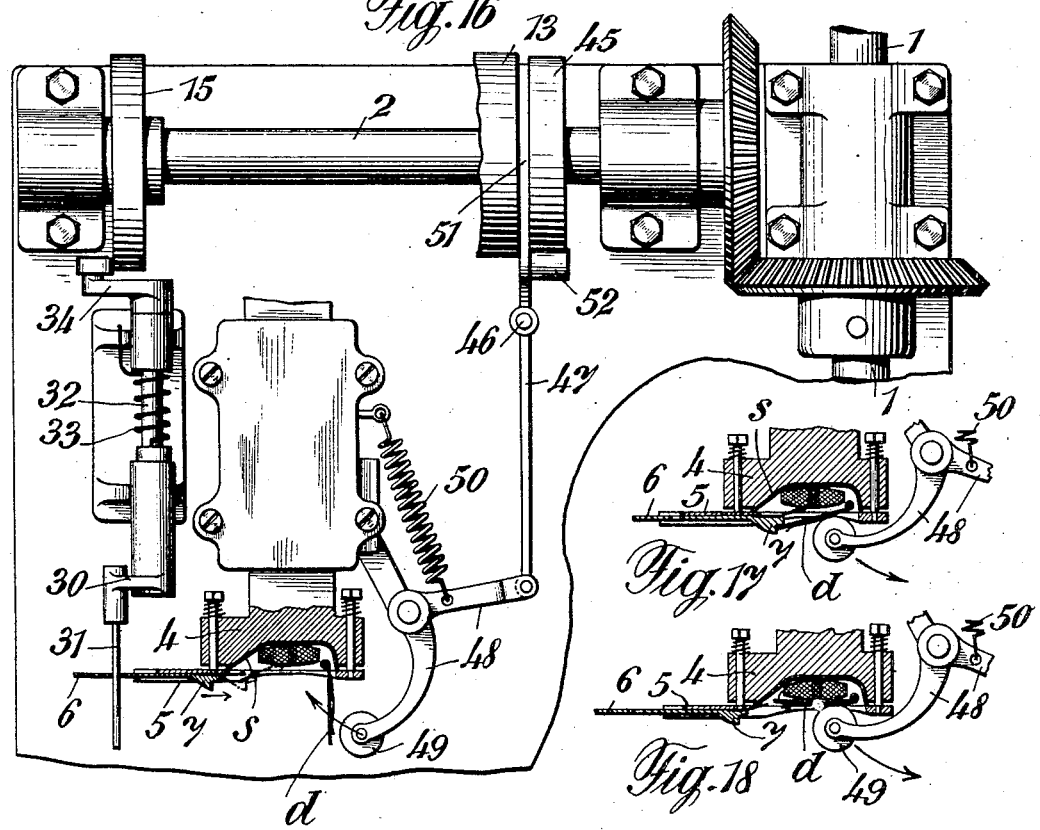

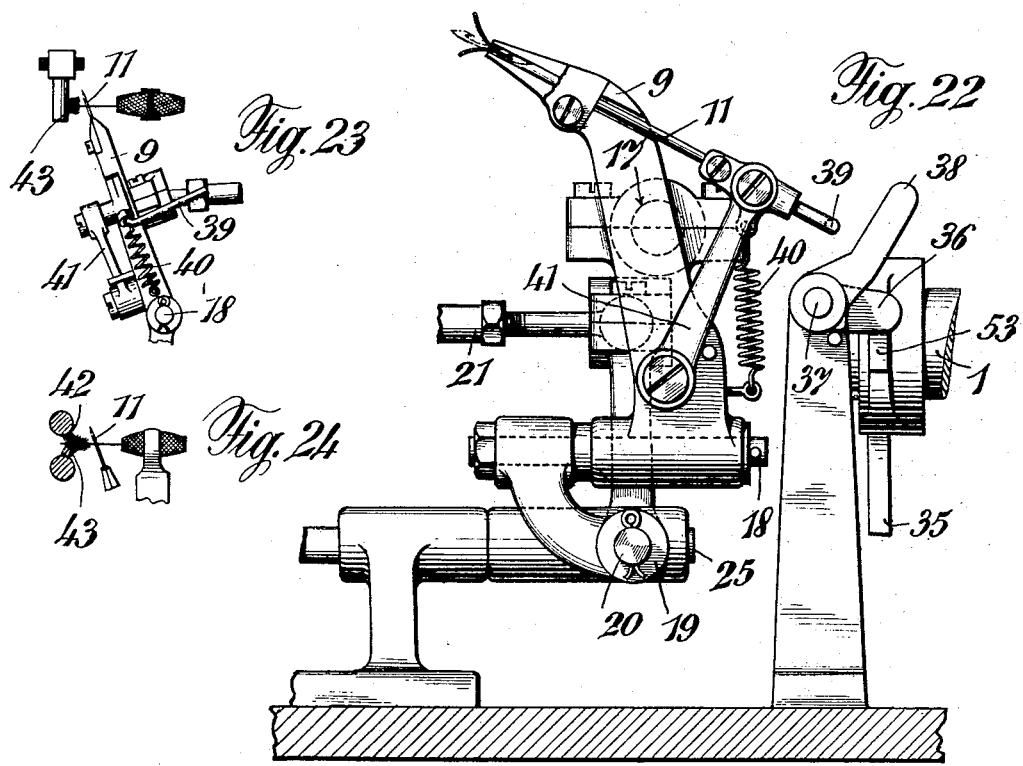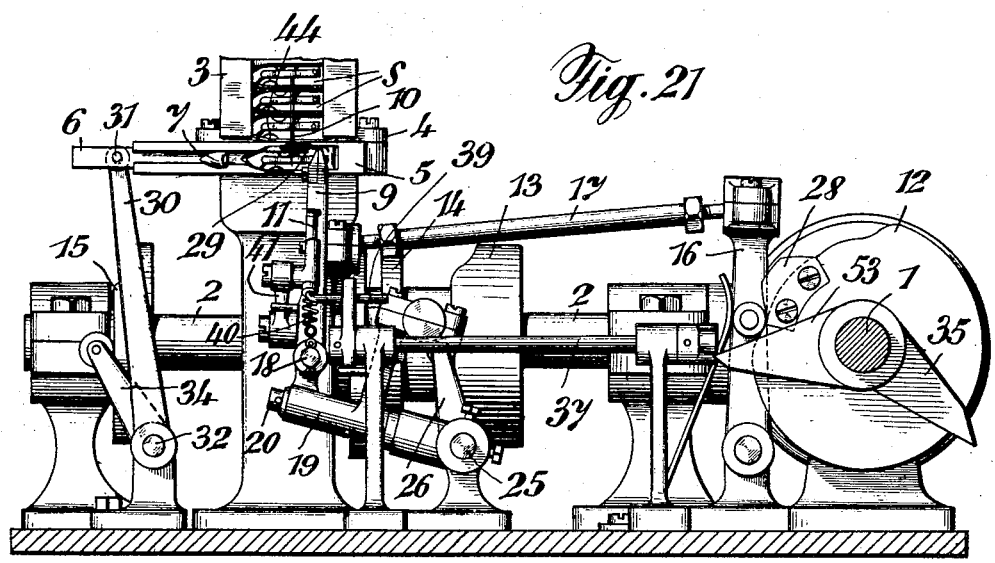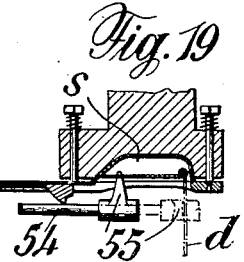

UNITED STATES PATENT OFFICE.

ALBERT BELZ, OF UNTER-GOLDACH, SWITZERLAND, ASSIGNOR TO THE FIRM OF HENRI LEVY, OF RORSCHACH, SWITZERLAND.

THREADING DEVICE FOR SHUTTLES.

1,052,208.

Specification of Letters Patent.

Patented Feb. 4, 1913.

Application filed July 9, 1912. Serial No. 708,428.

*To all whom it may concern:*

Be it known that I, ALBERT BELZ, a citizen of the Republic of Switzerland, residing at Unter-Goldach, Klosterstrasse, Switzerland, have invented new and useful Improvements in Threading Devices for Shuttles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a threading device for shuttles and is especially adapted to be used in machines for filling shuttles of embroidering machines, which device renders it possible in a new manner to thread as well shuttles with one slot as such with two slots in the cover. These filling machines are provided with a movable shuttle-bed, which holds the shuttle during the filling and threading operation, and with a threading member for threading the end of the bobbin inserted in the shuttle, which threading member is actuated by a plurality of cams.

According to this invention, the cam which acts to move the threading member in the longitudinal direction of the shuttle cover is provided with a detachable projection, and the shuttle-bed with a fixed tongue, which two parts coöperate in such a manner that, if the projection is detached, the threading member only performs the movement necessary for threading shuttles with one slot in the cover, whereat the bobbin thread freely passes the tongue, while if the projection is mounted, the threading member performs the movements necessary for threading shuttles with two slots in the cover, so that the bobbin thread is inserted at first in the one slot and thereafter by being caught by the tongue and being guided on it toward the second slot, inserted into this second slot in the shuttle cover.

One form of construction of the invention is illustrated by way of example in the accompanying drawings, in which—

Figure 1:
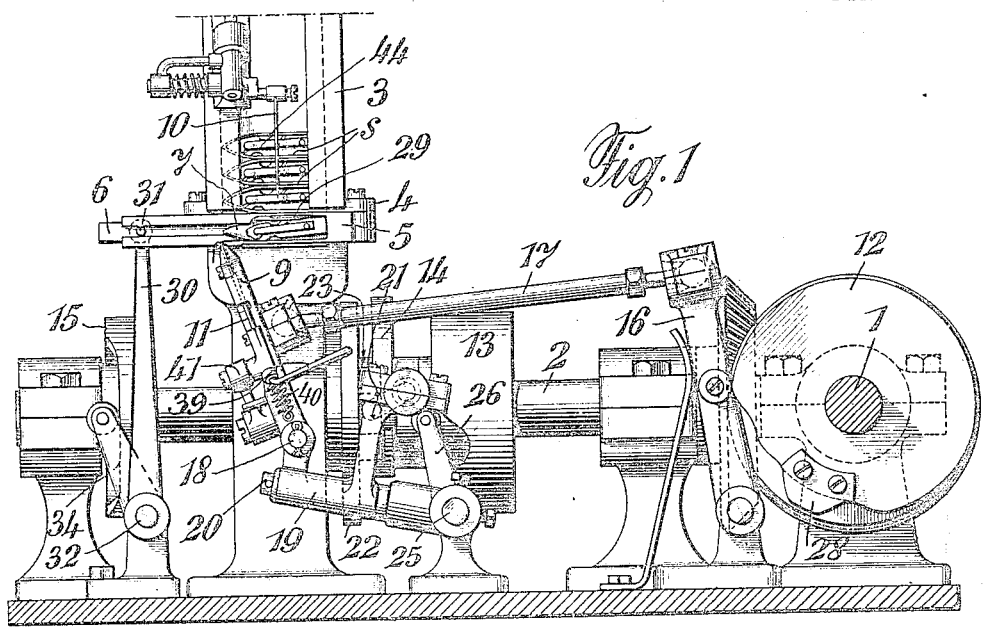
Figure 2:
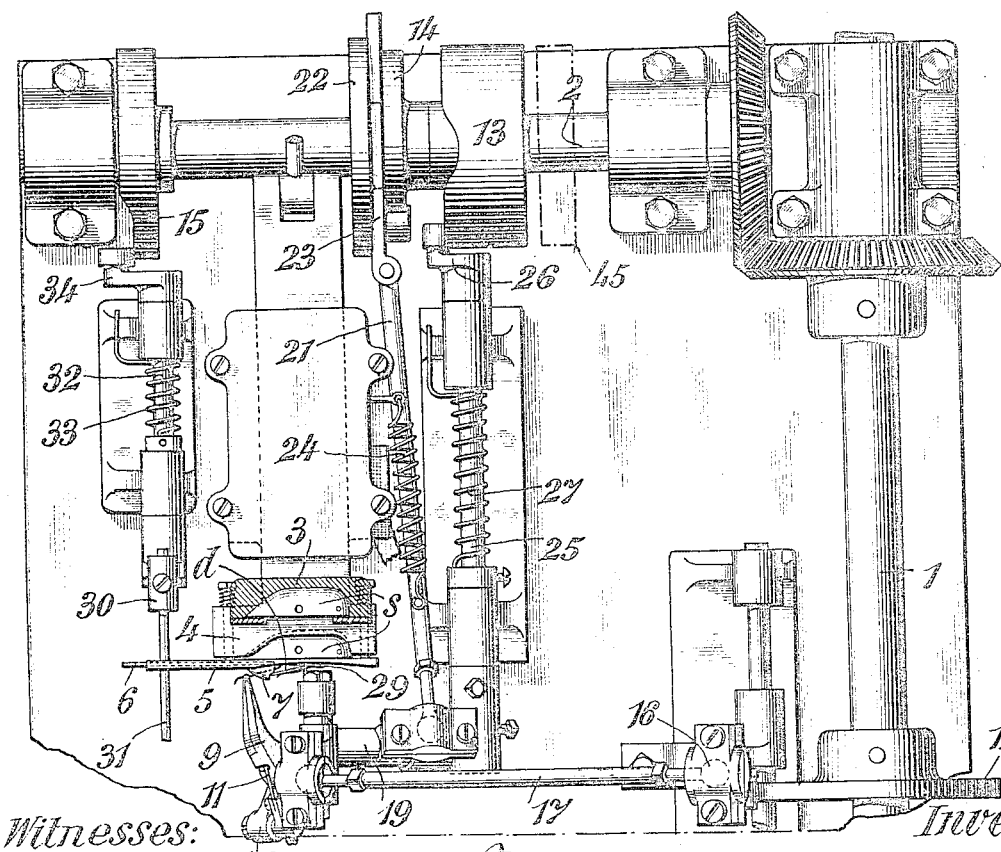

Figure 1 is a front elevation showing a shuttle-replenishing machine with a threading device according to this invention, parts being omitted for the sake of clearness. Fig. 2 is a plan view of the same, Figs. 3 to 12 illustrate the threading of a shuttle with two slots in the cover. Fig. 13 is a detail view of a portion of the threading device drawn on an enlarged scale. Fig. 14 illustrates the threading of a shuttle with only one slot in the cover. Fig. 15 is an elevation showing shuttle cover closing mechanism. Fig. 16 is a plan view of the same. Figs. 17 and 18 show parts of the same in another working position. Figs. 19 and 20 illustrate the opening of the shuttle cover. Fig. 21 is an elevation showing the mechanism for finally releasing the thread. Fig. 22 is a detail view. Figs. 23 and 24 illustrate the means for seizing the thread.

The shuttle-replenishing machine as illustrated is provided with two driving-shafts 1 and 2, which are connected to each other by bevel gears (Fig. 2), moreover with a feeding channel 3, into which the shuttles $s$ to be filled and threaded are inserted, and with a shuttle-bed 4 displaceably mounted under the lower end of the channel 3. The shuttle-bed 4 is provided with a movable cover 5 and with a slide 6 displaceably mounted on the latter. The slide carries a bearing 7 and a spring 8 (Fig. 4).

9 designates the threading member for drawing the bobbin thread in the slot or slots of the shuttle cover and under the braking spring of the same. 10 designates a hook for drawing the thread through the hole in the shuttle wall. The hook 10 is vertically reciprocated by any suitable means not shown on the drawing. The threading member comprises a universally movable arm in which a hook 11 is mounted to move longitudinally (Figs. 1 to 3). The hook is moved to project from the arm in order to seize the thread, whereafter it is drawn back into the arm together with the thread to secure the latter.

The shuttles are moved from the feeding channel 3 into the shuttle-bed in the well known manner by any suitable means which are not shown on the drawings, as they form no part of this invention. The end of the bobbin thread which is to be seized by the hook 11 is at first stretched by means of the brushes 42 and 43 (Figs. 23 and 24). The brushes are moved for this purpose against the bobbin end so that the end of the thread is caught by the bristles and stretched out in the axis of the bobbin. Thereafter the thread is seized by the hook 11. All these parts may be impelled in the manner shown in the Swiss Patent No. 50057.

The hook 11 is moved outward by means of the cam 35 on the shaft 1. This cam turns by means of an arm 36 the shaft 37, whereby an arm 38 on this latter shaft presses against a rearward projecting arm 39 of the hook 11, moving thus the hook 11 outward. The end of the thread is seized (Fig. 23) whereafter the hook is drawn back by means of the spring 40, which is secured by one end to an arm 41 connected to the hook 11.

The bobbins are inserted in the shuttles in a manner shown for instance in the above-named Swiss Patent No. 50057. Before this operation is performed, the shuttle cover $d$ is opened as illustrated in Figs. 19 and 20. An arm 54 which is displaceable in horizontal direction, is adapted to be turned about its axis and to be vertically reciprocated. By moving the arm toward the shuttle cover, a finger 55 on the front end of the arm is caused to engage in a lateral opening 44 in the shuttle cover. Hereafter the arm 54 is turned about its axis and moved forward so that the parts are transferred into the position shown in dotted lines in Figs. 19 and 20, whereby the cover $d$ is opened. The means for operating the arm 54, which may be mounted on the shafts 1 and 2, are not shown on the drawing, since these parts do not form a part of this invention.

By the cam 12 on shaft 1 the threading member 9 is moved substantially in the longitudinal direction of a shuttle to be threaded, and by the cams 13 and 14 on the shaft 2 the threading means are moved vertically and in the direction toward and away from the shuttle cover. For this purpose a lever 16 provided with a roller is pressed by a spring against the periphery of the cam 12, which lever is connected to the threading member 9 by means of a link 17 and a ball and socket joint. The arm of the threading member 9 is mounted to rock about a horizontal journal 18 mounted on a part 19. The latter part is mounted to rock about the journal 20 disposed in a direction at right angles with the journal 18 and connected to a rod 21 by means of a ball and socket joint. The rod 21 is pivotally connected to a slide 23 which is guided on the shaft 2 between the cams 14 and 22. A roller mounted on the slide is pressed by a spring 24 against the periphery of the cam 14. The journal 20 is disposed at right angles with an axle 25 and secured to the latter. The axle 25 carries an arm 26. A roller mounted on this arm is pressed by a torsion spring 27 against the cam 13. A projection 28 is detachably secured to the cam 12. The cover 5 of the shuttle-bed, which is provided with an oblong opening 5' (Figs. 11 and 12) through which the shuttle cover passes when it is opened or closed, fixedly carries at the upper longitudinal edge of the opening a tongue 29, which by its point projects beyond the outer wall of the cover 5 (Figs. 1, 8 to 13).

The slide 6 with the bearing 7 is engaged by a pin 31 secured to an arm 30. The arm 30 is mounted on an axle 32 which carries a second arm 34. A roller mounted on this latter arm is pressed by a torsion spring 33 against the disk 15.

$d$ designates the shuttle cover (Figs. 3 to 14), $b$ the braking spring, $s'$ one of the slots, $s''$ the second slot in the shuttle cover, $l$ the hole in the shuttle wall and $f$ the bobbin thread. The shuttle-cover $d$ is closed by means of a cam 45 on the shaft 2. A slide 51, which is mounted between the cams 13 and 45, is connected to a link 47 by a joint 46. The link 47 is attached to one arm of a crank-lever 48. The other arm of the lever carries a roller 49. A spring 50 presses a roller 52 on the slide 51 against the cam 45. By means of the cam 45 the cover $d$ is moved by the roller 49 from the position shown in Fig. 16 into the position shown in Fig. 17, in which latter position the point of the cover rests on the bearing 7 mounted on the slide 6. After the slide 6 has been moved outward, the cover $d$ is moved into the position of Fig. 18. Hereafter the lever 48 is moved back by the action of the spring 50.

In order to finally release the thread from the hook 11 a cam 53 is mounted on the shaft 1, which cam acts in a similar manner as the cam 35 to move the hook 11 forward to project from the threading member 9 (Figs. 21, 22).

The above described threading device operates as follows: If shuttles with two slots in the cover are to be filled and their slots to be threaded, as supposed in Figs. 1 to 13, the projection 28 remains on the disk 12. After a shuttle $s$ has been moved into the bed 4 and is secured in position by means of the cover 5, the shuttle cover $d$ is opened, the bed moved forward, a bobbin inserted in the shuttle, the bed moved back, the shuttle cover $d$ closed so far that its point leans against the bearing 7 on the slide 6, whereby the shuttle cover is secured in this partially closed position. The threading member 9 has in the meantime seized the end of the bobbin inserted in the shuttle, and is moved together with the backward moving shuttle-bed into the position shown in Figs. 3 and 4. While the shuttle-bed is stopped hereafter, the threading member moves in the direction of the arrows on the path shown in Fig. 3 by dot- and dash-lines, by which movement the thread $f$ is inserted into the first slot $s'$, moved under the braking spring $b$ and over the tongue 29 into the position shown in Figs. 5 and 6. Hereafter the threading member 9 is moved forward somewhat toward the bed 4, as shown by dot-and-dash-lines in Fig. 6, whereafter it is moved toward the left on the path shown in dot-and-dash-lines in Fig. 5, whereby the thread is caught by the tongue 29, guided by its point toward the second slot $s''$ in the shuttle cover, and inserted into this slot by the threading member (Figs. 7 and 8). Hereafter the slide 6 is moved outward whereby the shuttle-cover $d$ is released, so that it can be closed by the cover closing means (Figs. 9 and 10). Thereafter the hook 10 is moved through the hole $l$ in the shuttle wall (Fig. 11) and the threading member into the position shown in dotted lines in Fig. 9, whereby the thread is drawn a little downward and toward the shuttle cover (Fig. 12) so that the thread is caught by the hook 10, when the latter moves upward, and can be caught through the hole $l$. Thereafter the threaded shuttle is released by the cover 5 and falls downward, while the bed 4 moves back under the channel 3 in order to receive a new shuttle, and the threading member moves back into its initial position in order to seize the end of a new bobbin.

If shuttles with only one slot in the shuttle cover are to be filled, and their slot is to be threaded, the projection 28 is removed from the disk 12. The threading member only performs the motion, which is shown in Fig. 3 by dot- and dash-lines, whereby the bobbin-thread $f$ passes over the tongue 29. The threading member is stopped in the position shown in Fig. 14 until the shuttle-cover is closed and the bobbin-thread $f$ is drawn by the hook 10 through the hole in the shuttle wall, whereafter it moves back into its initial position in order to seize the end of a new bobbin, the completely threaded shuttle being released before.

By mounting the projection 28 on the disk 12, the threading member, in order to thread a shuttle with two slots in the cover is caused to move once more to and fro along the shuttle cover, as if the cam 12 without the projection acts on the threading member for threading shuttles with only one slot in the cover.

I claim:

1. In a shuttle-replenishing machine a threading device comprising a movable shuttle-bed, a threading member for threading the end of the bobbin thread, cams for imparting motion to the threading member, a projection removably mounted on one of said cams adapted to change the path of movement of said member, and a tongue secured to said shuttle-bed and coöperating with thread carried by said member when said projection acts to change the path of movement of said member.

2. In a shuttle-replenishing machine a threading device comprising a movable shuttle-bed, a threading member for threading the end of the bobbin thread, cams for imparting motion to the threading member, a projection removably mounted on one of said cams, a tongue secured to said shuttle-bed and coöperating with thread carried by said member in such a manner, that if the projection is removed, the threading member only performs the movement necessary for threading shuttles with one slot in the cover, while if the projection is mounted the threading means perform the movements necessary for threading shuttles with two slots in the cover.

3. In a shuttle-replenishing machine a threading device comprising a movable shuttle-bed, a threading member for threading the end of the bobbin thread, cams for imparting motion to the threading member, a projection removably mounted on one of said cams, a tongue secured to said shuttle-bed and coöperating with thread carried by said member in such a manner that, if when the projection is detached, the threading member only performs the movement necessary for threading shuttles with one slot in the cover, whereat the bobbin thread freely passes the tongue, while if the projection is mounted, the threading member performs the movements necessary for threading shuttles with two slots in the cover, so that the bobbin thread is inserted at first in the one slot and thereafter by being caught by the tongue and being guided on it toward the second slot, inserted into this second slot in the shuttle cover.

4. In a shuttle-replenishing machine a threading device comprising a movable shuttle-bed, a cover movably mounted on the shuttle-bed for securing a shuttle therein, an opening provided in the said cover, a threading member for threading the end of the bobbin thread, cams for imparting motion to the threading member, a projection removably mounted on one of said cams, a tongue secured to the cover of the shuttle-bed, the point of the tongue projecting beyond the front of the cover.

5. In a shuttle-replenishing machine a threading device comprising a movable shuttle bed, a threading member for threading the end of the bobbin thread, a cam for moving the threading member along the shuttle to be threaded, a projection removably mounted on the cam, a cam imparting motion to the threading member in vertical direction, a cam moving the threading member toward and away from the cover of the shuttle to be threaded, a tongue secured to said shuttle-bed and coöperating with said threading member.

In testimony that I claim the foregoing as my invention, I have signed my name in presence of two subscribing witnesses.

ALBERT BELZ.

Witnesses:
 EUGENE NABEL,
 RANDALL ATKINSON.